United States Patent
Breuer et al.

(10) Patent No.: US 7,606,534 B2
(45) Date of Patent: Oct. 20, 2009

(54) METHOD FOR OPERATING A BASE STATION OF A MOBILE RADIO SYSTEM, SIGNALING UNIT, CONTROL UNIT, MOBILE STATION AND COMPUTER PROGRAM

(75) Inventors: Volker Breuer, Bötzow (DE); Andreas Frey, Wallenhorst (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 583 days.

(21) Appl. No.: 10/569,842

(22) PCT Filed: Aug. 26, 2004

(86) PCT No.: PCT/EP2004/051919

§ 371 (c)(1),
(2), (4) Date: Feb. 28, 2006

(87) PCT Pub. No.: WO2005/025240

PCT Pub. Date: Mar. 17, 2005

(65) Prior Publication Data

US 2007/0036111 A1 Feb. 15, 2007

(30) Foreign Application Priority Data

Aug. 29, 2003 (DE) ................ 103 39 898

(51) Int. Cl.
*H04K 3/00* (2006.01)
*H04B 15/00* (2006.01)
*H04M 1/00* (2006.01)
*H04B 1/38* (2006.01)

(52) U.S. Cl. ............... 455/63.1; 455/1; 455/63.3; 455/550.1; 455/561

(58) Field of Classification Search .......... 455/1, 455/41.2, 63.1–63.4, 68–69, 70, 71, 423–425, 455/463–464, 466, 500–501, 507, 517, 522, 455/524, 526, 550.1, 556.2, 557–558, 561, 455/562.1, 701–703, 67.11, 114.2, 115.3, 455/277.1–277.2, 296; 370/277, 280–281, 370/294–295, 310, 310.1, 331–314, 328, 370/329, 335, 337–338, 341–345
See application file for complete search history.

(56) References Cited

U.S. PATENT DOCUMENTS 5,732,076 A * 3/1998 Ketseoglou et al. ......... 370/347
6,438,385 B1 8/2002 Heinonen et al.

(Continued)

FOREIGN PATENT DOCUMENTS

EP 0856999 8/1998

(Continued)

*Primary Examiner*—Meless N Zewdu
(74) *Attorney, Agent, or Firm*—Staas & Halsey LLP

(57) ABSTRACT

The reception of a first base station of a first mobile radio system in a first frequency range can be influenced by transmissions, associated with a connection, of at least one subscriber station of a second mobile radio system in a second frequency range adjacent to the first frequency range. A signaling unit of the first mobile radio station transmits a signal which is used to reduce the influence of the transmissions of the subscriber station of the second radio mobile system on the reception of the first base station in the first frequency range.

17 Claims, 3 Drawing Sheets

U.S. PATENT DOCUMENTS

| | | |
|---|---|---|
| 6,606,496 B1 | 8/2003 | Salvarani et al. |
| 6,961,595 B2 * | 11/2005 | Laroia et al. ................. 455/574 |
| 7,035,670 B2 * | 4/2006 | Kikuma ....................... 455/561 |
| 7,177,598 B2 * | 2/2007 | Klein et al. ................. 455/63.1 |
| 7,363,040 B2 * | 4/2008 | Fukui et al. ................. 455/454 |
| 2002/0102968 A1 | 8/2002 | Arend et al. |
| 2002/0111163 A1 * | 8/2002 | Hamabe .................... 455/425 |
| 2002/0177426 A1 * | 11/2002 | Ishiguro et al. ............. 455/296 |

FOREIGN PATENT DOCUMENTS

| | | |
|---|---|---|
| EP | 1035747 | 9/2000 |
| JP | 2002-354531 | 12/2002 |
| JP | 2003-9222 | 1/2003 |
| WO | WO 99/13673 | 3/1999 |

* cited by examiner

METHOD FOR OPERATING A BASE STATION OF A MOBILE RADIO SYSTEM, SIGNALING UNIT, CONTROL UNIT, MOBILE STATION AND COMPUTER PROGRAM

CROSS REFERENCE TO RELATED APPLICATIONS

This application is based on and hereby claims priority to PCT Application No. PCT/EP2004/051919 filed on Aug. 26, 2004 and German Application 10339898.8 filed Aug. 29, 2003, the contents of which are hereby incorporated by reference.

BACKGROUND OF THE INVENTION

The invention relates to a method for operating a base station of a mobile radio system, to a corresponding signaling unit, a control unit, a mobile station, and a computer program.

Cellular mobile radio systems have a plurality of radio cells to which coverage is as a rule provided by in each case one base station. A known type of cellular mobile radio system is based on the GSM (Global System of Mobile communication) standard widely used in Europe and elsewhere. For what is termed the third mobile radio generation, cellular networks will in the future be constructed in Europe based on the UMTS-FDD (Universal Mobile Telecommunications Standard—Frequency Division Duplex) standard. Corresponding frequency bands have been allocated in Germany and elsewhere to the future carriers of UMTS-FDD networks. Each carrier has at least one frequency band for the upward direction (uplink) and one frequency band for the downward direction (downlink), referred to jointly as what are termed paired bands. It will also be possible to use an additional (non-paired) frequency band for the downlink. That is because owing to the asymmetry of future data services more transmission capacity will be needed on the downlink than on the uplink.

FIG. 1 shows a possible arrangement of the frequency bands allocated to two different carriers or, as the case may be, to their mobile radio systems. The first mobile radio system has been assigned a frequency band UL1 for the uplink and a frequency band DL1 for the downlink. The second mobile radio system has been assigned a frequency band UL2 for the uplink, a frequency band DL2 for the downlink, and a further frequency band DL3 for the downlink. The networks concerned are assumed to be two geographically overlapping cellular mobile radio networks operated using the cited frequency bands.

Since the frequency bands UL1, UL2 shown in FIG. 1 for the uplink and the frequency bands DL1, DL2 for the downlink have in each case a mutual band spacing bordering on zero, which is to say are directly adjacent to each other, and base stations of the two mobile radio systems can be located widely apart (which is to say the associated radio cells have a large radius), connections in one mobile radio system can be subject to disruptions due to connections in the other mobile radio system. For example, signals transmitted in the frequency band UL2 from a subscriber station of the second system to a corresponding base station of the second mobile radio system can influence the reception quality of a base station which belongs to the first system and receives signals from other subscriber stations in its radio cell in the uplink band UL1. Disrupting will occur particularly when the subscriber station of the second system is situated far from its base station, and so sends with high power, but is also located near the base station of the first system. Conversely, disruptions can occur at the subscriber station of the second mobile radio system owing to signals transmitted in the frequency band DL1 from the base station of the first mobile radio system for the reception of which signals in the second mobile radio system the frequency band DL2 has actually been provided within the second mobile radio system. Since a base station's maximum transmitting power exceeds a subscriber station's, the above-cited disruptions between the two overlapping mobile radio systems are greater on the downlink than on the uplink. That applies at least as long as the additional downlink frequency band DL3 is not being used by the second mobile radio system.

FIG. 2 shows the effect, in the case of strong disruptive influences, of this state of affairs on systems based on the UMTS-FDD standard. The subscriber station or, as the case may be, base station sending in the respective band is indicated in FIG. 2 below the frequency bands. Considered here are a subscriber station MS1 and base station BS1 of the first mobile radio system and a subscriber station MS2 and base station BS2 of the second system. If the subscriber station MS2 of the second system moves away from its own base station BS2, which belongs to the second mobile radio system and with which it is currently communicating, and in doing so moves toward the base station BS1 of the first system, then it will have to increase its transmitting power to continue ensuring an acceptable connection to its own base station BS2. Disruptions will in this way occur within the frequency band UL1 of the first mobile radio system owing to the base station BS1 of the first system receiving transmissions from its own subscriber stations MS1. However, the disruptions due to the transmissions of the base station BS1 of the first mobile radio system in the frequency band DL1 will simultaneously increase even more in the transmissions of the base station BS2 of the second mobile radio system in the frequency band DL2 on the downlink. That is because the transmitting power of the last-cited base station BS1 is in any event greater than that of the subscriber station MS2 of the second mobile radio system.

When the disruptions are very strong, the signal quality in the frequency band DL2 of the second system will initially be impaired so much owing to the stronger disruptive influence on the downlink compared to the uplink that reception will no longer be possible at the subscriber station MS2 of the second mobile radio system. This is indicated by the numeral 1 in FIG. 2 and by crossing out of the frequency band DL2 on the downlink of the second mobile radio system. Since transmitting from the subscriber stations to the respective base station is not allowed according to the UMTS-FDD standard without the reception of signals on the downlink, according to said standard the connection concerned will also be automatically disconnected on the uplink in the frequency band UL2. This is indicated in FIG. 2 by the numeral 2 and the corresponding arrow. Transmissions from the subscriber station MS2 of the second mobile radio system in the frequency band UL2 are in this way prevented from excessively impairing the reception of the base station BS1 of the first system in the frequency band UL1.

The mechanism just described will not function, however, if the frequency band DL2 that is symmetrical to or, as the case may be, paired with the frequency band UL2 is not used on the downlink for the connection to the subscriber station MS2 in the second mobile radio system but, instead, the non-paired band DL3 (see FIG. 1). Owing to the larger band spacing d between the frequency bands DL1 and DL3 of the two mobile radio systems there will now be a reduced likelihood of disruptions between the signals transmitted from the base stations BS1, BS2. Strong disruptions of the signals transmitted between the two mobile radio systems' subscriber stations MS1, MS2 and their base station is, though, still possible owing to the smaller band spacing between the two uplink frequency bands UL1, UL2. Said disruptions cannot, therefore, be avoided in the manner explained with reference to FIG. 2, so that negative influences on the operation or, as the case may be, reception of the base station BS1 of the first mobile radio system can be expected.

SUMMARY OF THE INVENTION

One Possible object of the invention is to lessen the problem of disruptive influencing of the operation of the base station of the first mobile radio system due to transmissions of the subscriber stations of the second mobile radio system also when a non-paired frequency band is used for the downlink in the second mobile radio system.

The inventors propose a method for operating a first mobile radio system's first base station whose reception in a first frequency band can be influenced by transmissions, assigned to a connection, of at least one subscriber station of a second mobile radio system in a second frequency band adjacent to the first frequency band provides for a signaling unit of the first mobile radio system sending a signal serving to reduce the influence of transmissions of the subscriber station of the second mobile radio system on the reception of the first base station in the first frequency band.

The signaling unit of the first mobile radio system is, owing to the transmission of the signal, able to react to the influencing of the first base station's operation by the operation of the second mobile radio system. In order to reduce the disruptive influences due to the second mobile radio system, by way of transmitting its signaling unit's signal the first mobile radio system influences the operation of the second mobile radio system.

According to a development, signaling unit sends the signal in a third frequency band provided within the second mobile radio system for the subscriber station's reception of signals assigned to the connection. It is in this way ensured that the signal can be received by the subscriber station's and second mobile radio system's corresponding receiving devices configured for reception in the third frequency band specifically because they are able to receive signals transmitted to them within the second mobile radio system. It is hence not necessary to provide a separate high-frequency receiver for receiving the signaling unit's signal in the subscriber stations. Nor are any complex measurements necessary on frequencies currently not used for communicating with the own base station.

According to a first embodiment, the transmitting power of the signaling unit is set for the signal requiring to be sent by it in such a way that the connection of at least one of the subscriber stations of the second mobile radio system in the third frequency band will be disrupted so severely by the signal that another frequency band within the second mobile radio system will thereupon be assigned to said connection. What can be achieved as a result of the thus enforced assignment of another frequency band, which can take place optionally for the downlink and/or uplink, for example also through a change of cell for the corresponding subscriber station of the second mobile radio system, is that the disruptions affecting the reception of the first base station of the first mobile radio system will be reduced or avoided.

According to a second embodiment, the signaling unit's signal contains information serving to signal the possibility of the first base station's reception being influenced by the transmissions of the subscriber stations. This means the signal is embodied in such a way as to allow a corresponding possibility of the first base station's operation to be influenced to be inferred therefrom. Appropriate measures aimed at avoiding or, as the case may be, reducing corresponding disruptive influencing can, where applicable, in this way be taken by a station receiving the signaling unit's signal.

According to a development, it can therein be advantageous if the signal's information includes details of the first frequency band. It can then be inferred from the signal which uplink frequency band the first base station is using for its reception. It can then be decided on the basis of the signaling unit's signal whether transmissions of specific subscriber stations of the second mobile radio system can or cannot negatively influence the first base station's reception. This can be assessed as a function of which frequency bands are being used for the respective subscriber station's transmission and reception and how said bands are arranged relative to the first base station's first frequency band.

It is advantageous if the second mobile radio system's subscriber station receives the signal of the first mobile radio system's signaling unit then sends information about the signal received by it to a second base station of the second mobile radio system, which station is maintaining the connection with it. Network-side devices of the second mobile radio system can in this way be informed of the signaling unit's signal and will hence be able to accommodate the frequency bands used for the connection, if such action appears necessary.

According to an advantageous development, the second mobile radio system's subscriber station receives the signal of the first mobile radio system's signaling unit and a measure is ascertained of the receiving power of the signal received by the subscriber station from the signaling unit. It is decided on the basis of the ascertained measure of the receiving power whether the subscriber station will be assigned another frequency band for its connection. From the signal's receiving power it can be interfered to what extent the transmissions of the second mobile radio system's subscriber station can influence the first base station's reception. This can be achieved by, for example, the signaling unit's always transmitting its signal with a constant transmitting power. The receiving power at the second mobile radio system's subscriber station will then in most cases be proportional to the distance from the signaling unit, which is preferably situated in the immediate vicinity of the first base station or is even a constituent part thereof.

If implemented separately from the first base station the signaling unit will be particularly suitable for retro-equipping relevant mobile radio systems that have hitherto used known base stations and have no corresponding signaling unit. By contrast, integrating the signaling unit in the first base station will allow at least a part of the first base station's components, for example its transmitting antenna, to be used also for transmitting the signaling unit's signal.

According to a development, the extent to which the first base station's reception will be influenced is ascertained and the transmitting power of the signaling unit's signal accommodated as a function of said ascertained influencing extent. The receiving power of the signaling unit's signal at the second mobile radio system's subscriber station will hence be proportional to the previously determined influencing of the first base station's reception. The degree of influencing can then advantageously be estimated from the receiving power and, as a result of said estimation, a decision taken as to whether it is necessary to use another frequency band for the connection of the second mobile radio system's subscriber station.

It is advantageous if the signal from the first mobile radio system's signaling unit is transmitted only if disrupting of the first base station's reception exceeds a certain limit. The signaling unit will in this way need transmitting power only if it will actually be of practical advantage to transmit the signal for avoiding disruptions. Interferences resulting from transmitting the signaling unit's signal will furthermore be reduced in this way. In other embodiments the signaling unit's signal can, however, also be transmitted continuously or at regular intervals, for example periodically.

As already mentioned above, the third frequency band can as a function of the signal sent by the signaling unit be replaced by another frequency band of the second mobile radio system for signals of the connection that are to be received by the second mobile radio system's subscriber station. The frequency band selected as another can in particular be one located closer than the third frequency band to a corresponding downlink frequency band of the first base station. The mechanism explained above with the aid of FIG. 2 may in this way in certain circumstances be re-facilitated in the case of a UMTS-FDD system.

It is alternatively or additionally possible for the second frequency band UL2 to be replaced on the basis of the signal sent by the signaling unit by another frequency band of the second mobile radio system for signals of the connection that are to be transmitted by the second mobile radio system's subscriber station. It is especially favorable therein if the other frequency band is further than the second frequency band from the first base station's first frequency band UL1 so that disruptive influences due to the transmissions of the second mobile radio system's subscriber station which impair the first base station's reception are reduced.

According to an alternative embodiment, the connection of the second mobile radio system's subscriber station is changed over on the basis of the signal sent by the signaling unit from a second base station, providing coverage to said subscriber station, of the second mobile radio system to another base station. This process, referred to as handover, entails transferring the connection from the second base station to another base station of the second mobile radio system.

The signaling unit and computer program have the components or, as the case may be, instructions required for implementing the method and its developments.

The mobile station for a second mobile radio system has a corresponding receiver to receive a signal of a signaling unit of the first mobile radio system.

The control unit for allocating radio channels in a second mobile radio system is embodied in such a way that it assigns a new frequency band to a subscriber station of the second mobile radio system as a function of a signal sent by a signaling unit of a first mobile radio system.

The method is especially suitable for applying to mobile radio systems based on the UMTS-FDD standard. Mobile radio systems based on any other standards can also be considered, though. It is in particular not absolutely essential for the first and second mobile radio system to be cellular mobile radio systems. The first and second mobile radio system's subscriber stations do not all have to be mobile. Rather it is the case that at least some of the subscriber stations can also be stationary.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
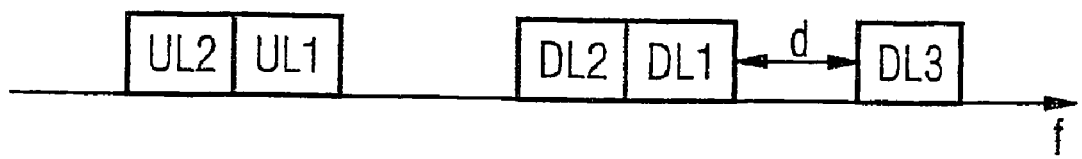
FIG. 1 shows the arrangement of frequency bands for the uplink and for the downlink for two mobile radio systems.

Reference will now be made in detail to the preferred embodiments of the present invention, examples of which are illustrated in the accompanying drawings, wherein like reference numerals refer to like elements throughout.

The mobile radio systems considered below are systems based on the UMTS-FDD standard.

Figure 5:
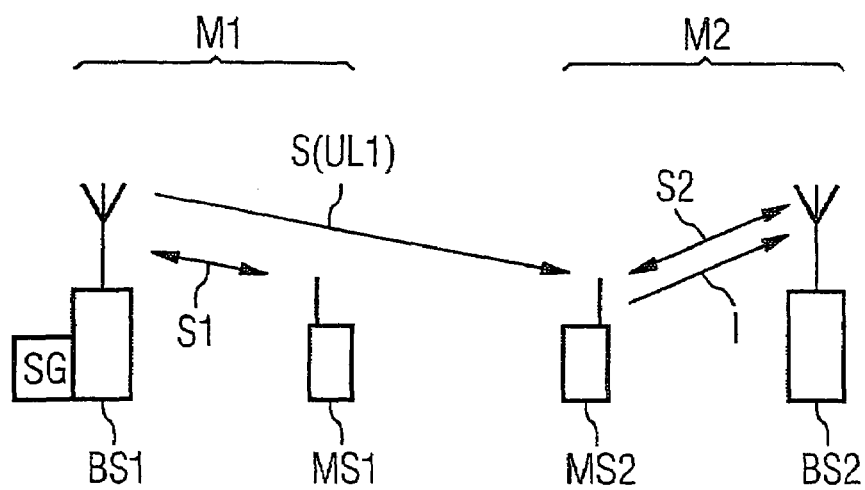
FIG. 5 shows base stations and mobile stations of two mobile radio systems overlapping in places.

FIG. 5 shows a segment of two cellular mobile radio systems M1, M2, the term "cellular" meaning they have a plurality of radio cells. The first mobile radio system M1 includes a first base station BS1 that communicates over a connection S1 with a first subscriber station MS1. The second mobile radio system M2 includes a second base station BS2 that communicates over a second connection S2 with a second subscriber station MS2. The radio cells or, as the case may be, coverage areas of the two base stations BS1, BS2 are intended to geographically overlap so that disruptive influences can occur between the mobile radio systems M1, M2 if the frequency bands used herefor have mutual spacings that are too small.

Figure 2:
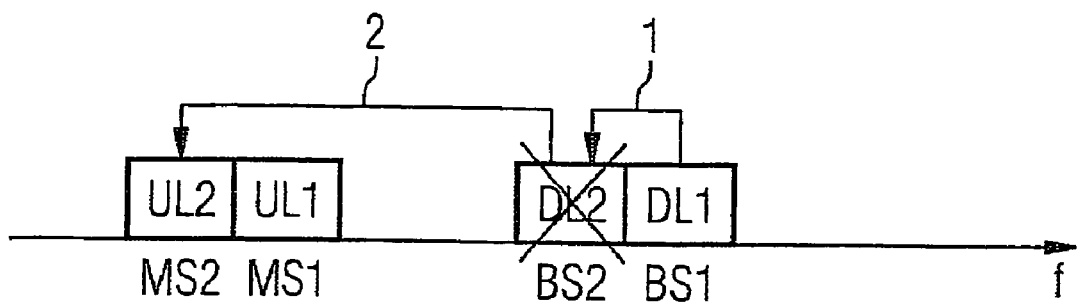
FIG. 2 shows the influence of disruptions between frequency bands shown in FIG. 1 according to the related art.
Figure 3:
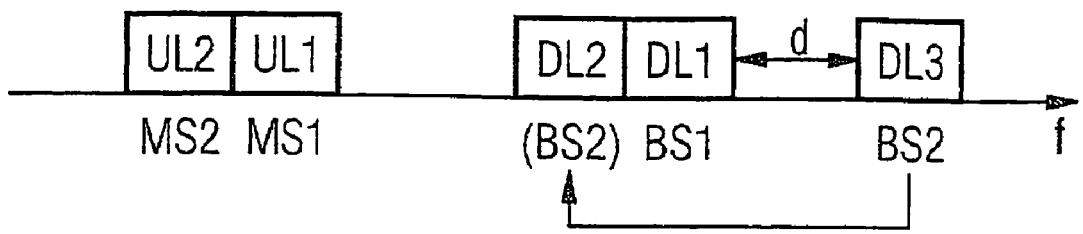
FIG. 3 shows the account taken of disruptions in an exemplary embodiment of the invention.

FIG. 3 shows the frequency bands used for the connections S1, S2 shown in FIG. 5. The stations shown in FIG. 5 respectively sending in the corresponding frequency band are indicated below the frequency bands in FIG. 3. For its transmissions of the first connection S1 to the first subscriber station MS1 the first base station BS1 uses a downlink frequency band DL1. For the first connection S1 the first subscriber station MS1 uses an uplink frequency band UL1. The two frequency bands UL1, DL1 of the first connection S1 form two paired frequency bands. For the second connection S2 the second base station BS2 uses an asymmetrical downlink band DL3 having a comparatively large band spacing b from the downlink band DL1 of the first base station BS1. Another downlink band DL2 is furthermore available to the second base station BS2, which band said station is currently not using for the second connection S2 and which is directly adjacent to the downlink band DL1 of the first base station BS1. For the second connection S2 the second subscriber station MS2 uses an uplink band UL2 which is directly adjacent to the uplink band UL1 of the first subscriber station MS1. Because the second base station BS2 according to FIG. 3 is not using the downlink band DL2 directly adjacent to the downlink band DL1 of the first base station BS1 but, instead, the asymmetrical downlink band DL3, the mechanism described above with the aid of FIG. 2 cannot be implemented.

According to FIG. 5 the first mobile radio system M1 also has a signaling unit SG which is located in the immediate vicinity of the first base station BS1 and can, for example, be an integral constituent part of the first base station BS1. In this exemplary embodiment the signaling unit SG is linked to the antenna of the first base station BS1 and transmits a signal S via it. This takes place not on the downlink band DL1, which the first base station BS1 is using for operating its connections S1, but on the asymmetrical downlink band DL3 being used by the second base station BS2 of the second mobile radio system M2. The second subscriber station MS2 of the second mobile radio system M2 receives the signal S of the signaling unit SG and forwards corresponding information I to the second base station BS2 having a connection to it.

In the exemplary embodiment here under consideration the signal S of the signaling unit SG contains information indicating in which uplink band UL1 the first base station BS1 is being operated. This is indicated in FIG. 5 by the reference numeral in parentheses. Via its information I the second mobile station MS2 conveys said indication of the uplink band UL1 to the second base station BS2. The second subscriber station MS2 furthermore ascertains the receiving power of the signal S. Likewise via the information I it notifies the second base station BS2 of the result of said ascertaining. The second base station BS2, or a central unit (not shown in FIG. 5) connected thereto, such as, for example, a base-station controller, of the second mobile radio system M2 evaluates the information I and decides whether it will be of practical advantage to assign another frequency band for the second connection S2 to the second subscriber station MS2. That is because on the basis of the information about the frequency band UL1 used on the uplink by the first base station BS1 it can be assessed in the second mobile radio system M2 whether the uplink band UL2 used for the second connection S2 is so close to the uplink band UL1 of the first base station BS1 that the reception of the first base station BS1 will be impaired by the transmissions of the second subscriber station MS2. Said assessment also takes account of the receiving power, ascertained by the second subscriber station MS2, of the signal S of the signaling unit SG. That is because in this exemplary embodiment the signaling unit SG transmits its signal S with a constant transmitting power. It can then be assessed on the basis of the receiving power at the second subscriber station MS2 how close the second subscriber station MS2 is to the signaling unit SG and hence also to the first base station BS1. The closer the second subscriber station MS2 is to the first base station BS1, the greater will be the disruptions caused by the former at the first base station BS1.

If the evaluation of the information I by the second base station BS2 or by another central unit of the second mobile radio system M2 indicates that the reception of the first base station BS1 is likely to be excessively impaired by the transmissions of the second subscriber station MS2 (this can be determined by, inter alia, comparing the value of the receiving power of the signal S at the second subscriber station MS2 with a corresponding limiting value), then said evaluation will in this exemplary embodiment cause the downlink band DL3 used for the second connection S2 to be changed over to the other downlink band DL2 available thereto which is directly adjacent to the downlink band DL1 of the first base station BS1. This is indicated by the arrow in FIG. 3 and by the reference numeral BS2 in parentheses. Said changeover of the downlink frequency band used produces the constellation shown in FIG. 2 for the exemplary embodiment shown in FIG. 5. It is therefore possible to implement the mechanism explained above with the aid of FIG. 2. Excessive disruption of the reception of the first base station BS1 by the second mobile radio system M2 is avoided in this way.

Figure 4:
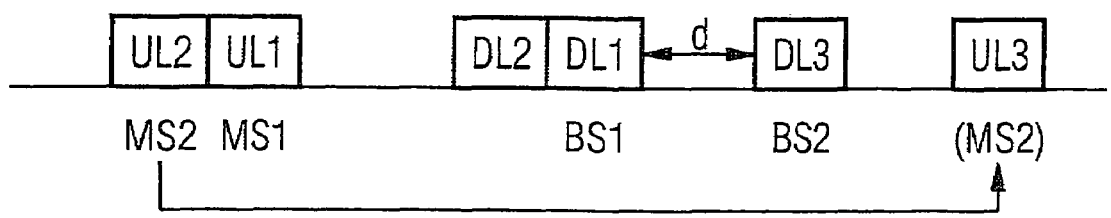
FIG. 4 shows the account taken of disruptions in a second exemplary embodiment of the invention.

FIG. 4 shows another measure that can be taken within the second mobile radio system M2 on the basis of the information I conveyed by the second subscriber station MS2. It is herein assumed that a further uplink band UL3 is available to the second mobile radio system M2. If it is now determined that the disruptions to the first base station BS1 caused by the second subscriber station MS2 will become excessive, the uplink band UL2 will not continue being used for the second connection S2 but, instead, the further uplink band UL3 which, together with the downlink band DL3 used for the connection S2, forms a pair of frequency bands. Changing over of the uplink bands UL2, UL3 within the second mobile radio system M2 is indicated in FIG. 4 by the arrow. Because the further uplink band UL3 has a larger band spacing from the uplink band UL1 used within the first mobile radio system, further disruptions caused at the first base station BS1 by the transmissions of the second subscriber station MS2 are now no longer to be feared.

The further uplink band UL3 in FIG. 4 can in other exemplary embodiments also be located below the first uplink channel UL1 (meaning to the left thereof in FIG. 4).

Figure 6:
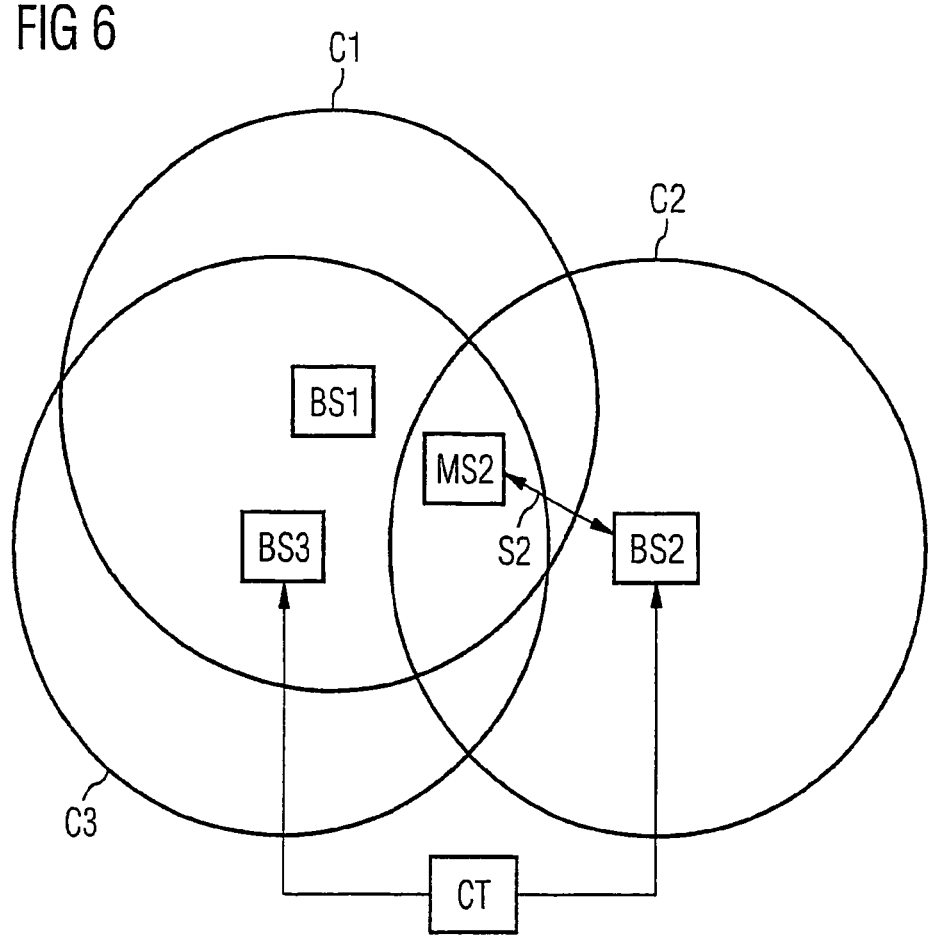
FIG. 6 shows the account taken of disruptions in a third exemplary embodiment of the invention.

FIG. 6 is a plan view of the relative arrangement of the first mobile radio system's first base station BS1, of the second mobile radio system's second base station BS2, and of the second subscriber station MS2 communicating with the second base station BS2 over the connection S2. Shown also is a third base station BS3 of the second mobile radio system M2, which station has a smaller distance than the second base station BS2 from the second subscriber station MS2. FIG. 6 also shows the radio cells C1, C2, C3 or, as the case may be, coverage areas of the three base stations BS1, BS2, BS3. A further possibility for reacting to the severe impairment, determined according to the explanations relating to FIG. 5, of the reception of the base station BS1 due to the transmissions of the second subscriber station MS2 is to hand over the connection S2 of the second subscriber station MS2 from the second base station BS2 to the third base station BS3 within the second mobile radio system M2. Said connection handover is controlled by a central unit CT of the second mobile radio system M2, which unit can be, for example, a base-station controller and is connected to the two base stations BS2, BS3 of the second mobile radio system M2.

Owing to the smaller distance of the second subscriber station MS2 from the third base station BS3 compared to that from the second base station BS2, the second subscriber station MS2 can, after the connection S2 has been handed over, send with comparatively lower power than previously. Even if the same frequency bands UL2, DL3 as before are used for the second connection S2 following connection handover, the disruptions at the first base station BS1 due to the second subscriber station MS2 will consequently be reduced. This mechanism will also function independently of the distance between the first base station BS1 and the third base station BS3 if the third base station BS3 uses frequency bands that are not adjacent to those of the first base station BS1.

In other exemplary embodiments it is possible to dispense with conveying of the information I in FIG. 5 by the second subscriber station MS2. The signaling unit SG can instead select the transmitting power for the signal S as being so great that the reception of the second subscriber station MS2 in the downlink band DL3 of the second mobile radio system M2 will be disrupted so severely that the data of the second connection S2 can no longer be properly detected by the second subscriber station MS2. That will be recognized within the second mobile radio system M2, whereupon another uplink band and/or new downlink band will automatically be assigned or the connection will be handed over to the third base station BS3.

In the last-cited exemplary embodiment it is particularly favorable that the signaling unit SG sets the transmitting power for the signal S as a function of the influencing of the reception of the first base station BS1. To determine the extent to which the reception of the first base station BS1 will be influenced, a signal-to-noise ratio can, for example, be determined for the first connection S1 on the uplink. The poorer the signal-to-noise ratio at the first base station BS1 is, the greater will be the power selected for sending the signal S, with this only being transmitted if disruptions to the reception of the first base station BS1 exceed a certain limit, which is to say if the signal-to-noise ratio falls below a certain minimum value.

Figure 7:
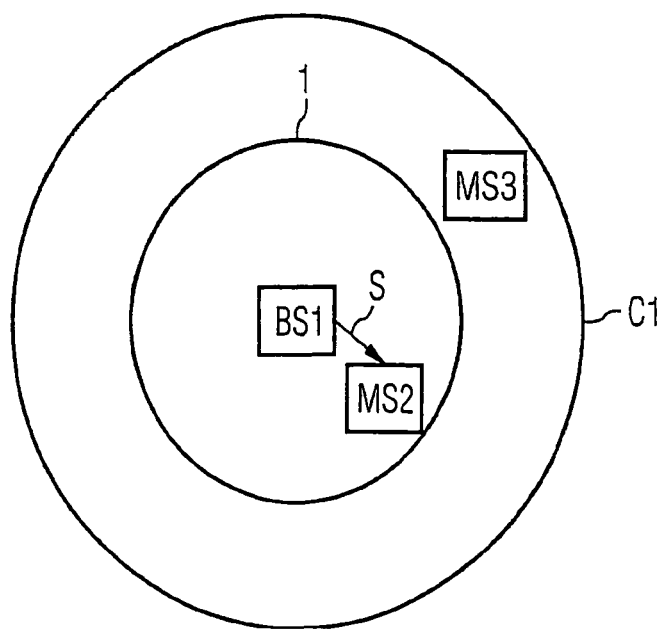
FIG. 7 shows the operation of two mobile stations of the second mobile radio system near a base station of the first mobile radio system shown in FIG. 5.

Again as a plan view, FIG. 7 shows the first base station BS1 of the first mobile radio system M1 within said station's radio cell C1. The signal S is transmitted by the signaling unit SG unidirectionally via the first base station BS1. At the edge of an area 1 in FIG. 7 the receiving power of the signal S attains a previously specified limiting value at subscriber stations MS2 located there. The second subscriber station MS2 according to FIG. 5 will only convey the information I to the second base station BS if said limiting value of the receiving power is exceeded. This again proceeds from the exemplary embodiment explained as the first with the aid of FIG. 5. If the second subscriber station MS2 is located within the area 1 it will be able to perform the actions explained with the aid of FIG. 5.

A third subscriber station MS3 of the second mobile radio system M2 is so far within the first radio cell C1 from the first base station BS1 that the receiving power of the signal S at said subscriber station's position is below the critical limiting value. It therefore infers that no impairment will be caused by it to the reception of the first base station BS1 and accordingly will not send any information I to the second base station BS2 communicating with it.

Since the signal S in the exemplary embodiment according to FIG. 5 contains an indication of which uplink band UL1 the first base station BS1 is using, the second subscriber station MS2 is able, on the basis of said indication, to assess whether any impairment at all occasioned by it to the reception of the first base station BS1 can be expected. This depends on what band spacing the uplink band used by the second subscriber station MS2 has to the uplink band UL1 used by the first base station BS1. If, departing from FIG. 3 and FIG. 4, the second subscriber station MS2 happens, say, from the outset not to use the uplink band UL2 but, instead, for example the further uplink band UL3 drawn in FIG. 4, the second subscriber station MS2 could already determine from what is indicated in the signal S that any influencing is precluded, so that further measures on its own part will not be necessary. In this case it will then be possible to omit ascertaining the receiving power of the signal S at the second subscriber station MS2 as well as conveying the information I to the second base station BS2.

The examination, explained with the aid of FIG. 7, of the threshold value for the receiving power of the signal S at the second subscriber station MS2 can alternatively also be carried out after the corresponding information I has been conveyed according to FIG. 5 in the second base station BS2 or, as the case may be, in a central unit connected thereto of the second mobile radio system M2.

The signaling unit SG, which is assigned to the first base station BS1, transmits the signal S in each asymmetrical downlink band DL3 of all mobile radio systems overlapping the first mobile radio system M1 in places. To identify the uplink band UL1 being used by the first base station BS1, special signatures by which the uplink band UL1 being used is signaled in coded form are therein employed within the signal S.

Because the signal S of the signaling unit SG is transmitted in the same frequency band as that used for regular reception by the second subscriber station MS2 and by further subscriber stations of the second mobile radio system M2, said subscriber stations can receive the signal S without changing the frequency band received by them, which is to say without what are termed inter-frequency measurements, alongside their own connections S2 within the second mobile radio system.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for operating a first base station of a first mobile radio system, comprising:
   transmitting a first signal from a first mobile station to the first base station in a first frequency band;
   influencing the first signal transmitted to the first base station with a second signal transmitted by a subscriber station of a second mobile radio system in a second frequency band adjacent to the first frequency band;
   receiving the first signal at the first base station after the first signal is influenced; and
   sending a third signal from a signaling unit of the first mobile radio system to reduce the influence of the signal transmitted by the subscriber station on the first signal wherein
   the third signal of the signaling unit contains information serving to signal the first signal being influenced by the second signal,
   the subscriber station receives the third signal,
   the subscriber station is connected to a second base station of the second mobile radio system, and
   the subscriber station sends the second base station information about the third signal.

2. The method as claimed in claim 1, wherein
   the second signal is transmitted as part of a connection in the second frequency band between the subscriber station and a second base station of the second mobile radio system, and
   the signaling unit sends the third signal in a third frequency band provided within the second frequency band.

3. The method as claimed in claim 1, wherein the information provides frequency information for the first frequency band.

4. The method as claimed in one of the claim 1, wherein
   the subscriber station receives the third signal,
   the subscriber station measures a receiving power of the third signal, and
   based on the receiving power, it is decided whether the subscriber station will be assigned a frequency band different from the second frequency band for transmissions from the subscriber station.

5. The method as claimed in claim 2, wherein
   the signaling unit transmits the third signal with a transmission power that severely disrupts at least the connection between the subscriber station and the second base station, and
   the transmission power of the third signal causes a frequency band other than the second frequency band to be assigned to said connection between the subscriber station and the second base station.

6. The method as claimed in claim 1, further comprising:
determining how much the first signal is influenced by the second signal, and
controlling a transmission power for the third signal as a function of how much the first signal is influenced by the second signal.

7. The method as claimed in claim 1, wherein the third signal is transmitted by the signaling unit only if the second signal disrupts the first signal in an amount that exceeds a disruption limit.

8. The method as claimed in claim 1,
the second signal is transmitted as part of a connection in the second frequency band between the subscriber station and a second base station of the second mobile radio system, and
the third signal causes the connection between the subscriber station and the second base station to switch to a frequency band other than the second frequency band.

9. The method as claimed in claim 7, wherein
the second signal is transmitted as part of a connection between the subscriber station and a second base station of the second mobile radio system,
as part of the connection between the subscriber station and the second base station, downlink signals are transmitted in the third frequency band from the second base station to the subscriber station, and
based on the third signal, the third frequency band is replaced by another frequency band of the second mobile radio system for downlink signals transmitted to the subscriber station.

10. The method as claimed in claim 7, wherein
the second signal is transmitted as part of a connection between the subscriber station and a second base station of the second mobile radio system, and
based on the third signal, the second frequency band is replaced with another frequency band of the second mobile radio system for signals transmitted by the subscriber station of the second mobile radio system.

11. The method as claimed in claim 7, wherein
the second signal is transmitted as part of a connection between the subscriber station and a second base station of the second mobile radio system, and
based on the third signal, the connection of the subscriber station is changed from the second base station to another base station of the second mobile radio system.

12. A signaling unit for a first mobile radio system having a first base station that receives a first signal in a first frequency band from a mobile station, the first signal received by the first base station being influenced by a second signal transmitted by a subscriber station of a second mobile radio system, the second signal being transmitted in a second frequency band adjacent to the first frequency band, the signaling unit comprising:
a signal generator to generate a third signal to reduce the influence of transmissions from the subscriber station of the second mobile radio system on the first signal; and
a transmitter to transmit the third signal wherein
the third signal of the signaling unit contains information serving to signal the first signal being influenced by the second signal,
the subscriber station receives the third signal,
the subscriber station is connected to a second base station of the second mobile radio system, and
the subscriber station sends the second base station information about the third signal.

13. The signaling unit as claimed in claim 12 wherein signaling unit is part of the first base station.

14. The signaling unit as claimed in claim 12, wherein the signaling unit is a distinct device separate from the first base station.

15. A control unit for allocating radio channels in a second mobile radio system having a subscriber station that transmits a second signal in a second frequency band, which second signal can influence a first signal transmitted by a mobile station to a first base station of a first mobile radio system, the first signal being transmitted in a first frequency band adjacent to the second frequency band
wherein the control unit assigns the subscriber station a frequency band different from the second frequency band as a function of a third signal sent by a signaling unit of the first mobile radio system wherein
the third signal of the signaling unit contains information serving to signal the first signal being influenced by the second signal,
the subscriber station receives the third signal,
the subscriber station is connected to a second base station of the second mobile radio system, and
the subscriber station sends the second base station information about the third signal.

16. A mobile station for a second mobile radio system, comprising:
a transmitter to transmit a second signal in a second frequency band, which is capable of influencing the quality of a first signal transmitted from a subscriber station to a first base station of a first mobile radio system, the first signal being transmitted in a first frequency band adjacent to the second frequency band; and
a receiver to receive a third signal from a signaling unit of the first mobile radio system, the mobile station reducing the influence of its transmissions on the first signal, based on the third signal wherein
the third signal of the signaling unit contains information serving to signal the first signal being influenced by the second signal,
the mobile station receives the third signal,
the mobile station is connected to a second base station of the second mobile radio system, and
the mobile station sends the second base station information about the third signal.

17. A computer readable storage medium containing a program which when executed by a computer performs a method for operating a first base station of a first mobile radio system, the method comprising:
transmitting a first signal from a first mobile station to the first base station in a first frequency band;
influencing the first signal transmitted to the first base station with a second signal transmitted by a subscriber station of a second mobile radio system in a second frequency band adjacent to the first frequency band;
receiving the first signal at the first base station after the first signal is influenced; and
sending a third signal from a signaling unit of the first mobile radio system to reduce the influence of the signal transmitted by the subscriber station on the first signal wherein
the third signal of the signaling unit contains information serving to signal the first signal being influenced by the second signal,
the subscriber station receives the third signal,
the subscriber station is connected to a second base station of the second mobile radio system, and
the subscriber station sends the second base station information about the third signal.

* * * * *

UNITED STATES PATENT AND TRADEMARK OFFICE
CERTIFICATE OF CORRECTION

PATENT NO. : 7,606,534 B2
APPLICATION NO. : 10/569842
DATED : October 20, 2009
INVENTOR(S) : Volker Breuer et al.

It is certified that error appears in the above-identified patent and that said Letters Patent is hereby corrected as shown below:

Title Page, Column 1 (Title), Item [54] Line 4, change "STATION" to --STATION,--.

Column 1, Line 4, change "STATION" to --STATION,--.

Column 10, Line 51, change "in one of the claim" to --in claim--.

Signed and Sealed this

Twenty-sixth Day of January, 2010

David J. Kappos
*Director of the United States Patent and Trademark Office*